United States Patent
Swartz et al.

(10) Patent No.: US 11,242,890 B2
(45) Date of Patent: Feb. 8, 2022

(54) ARTICULATING JOINT WITH A HIGH WEAR LIFE

(71) Applicant: GM GLOBAL TECHNOLOGY OPERATIONS LLC, Detroit, MI (US)

(72) Inventors: Julie A. Swartz, Commerce Township, MI (US); Alyn M. Gray, Royal Oak, MI (US); Grant W. Brady, Howell, MI (US); Zhe Li, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 678 days.

(21) Appl. No.: 16/026,183

(22) Filed: Jul. 3, 2018

(65) Prior Publication Data
US 2020/0011370 A1  Jan. 9, 2020

(51) Int. Cl.
| F16C 11/04 | (2006.01) |
| B33Y 10/00 | (2015.01) |
| B33Y 80/00 | (2015.01) |
| F02B 37/18 | (2006.01) |

(52) U.S. Cl.
CPC .............. *F16C 11/04* (2013.01); *B33Y 10/00* (2014.12); *B33Y 80/00* (2014.12); *F02B 37/186* (2013.01)

(58) Field of Classification Search
CPC ...... F02B 37/183; F02B 37/186; F16B 21/10; F16B 21/12; F16B 2021/14; F16C 11/04; F16C 11/10; Y10T 403/32008; Y10T 403/32081; Y10T 403/32951; Y10T 403/32967; Y10T 403/58; Y10T 403/587
See application file for complete search history.

(56) References Cited

U.S. PATENT DOCUMENTS

| 52,809 | A | * | 2/1866 | Acker | F16C 11/04 403/162 |
| 3,315,537 | A | * | 4/1967 | Keller | F16H 59/0208 74/519 |
| 5,553,962 | A | * | 9/1996 | Eustache | B60S 1/24 15/250.32 |
| 5,996,348 | A | * | 12/1999 | Watkins | F02B 37/183 60/602 |

(Continued)

FOREIGN PATENT DOCUMENTS

| CN | 106825574 A | 6/2017 |
| DE | 102016224267 A1 | 6/2018 |
| JP | 2012149611 A | 8/2012 |

OTHER PUBLICATIONS

Chinese Office Action for Chinese Application No. 201910372540.5; Report Mail dated Feb. 18, 2021—with Translation (Year: 2021).*

(Continued)

*Primary Examiner* — Amber R Anderson
*Assistant Examiner* — Alexus Camero
(74) *Attorney, Agent, or Firm* — Cantor Colburn LLP

(57) ABSTRACT

An articulating joint includes a linkage and a pin. The linkage includes a surface defining an opening. The pin extends along a pivot axis, and is disposed, at least in-part, in the hole. The pin has a core component made of a first material, and an outer component that at least partially circumferentially surrounds the core component and is made of a wear resistant material. The outer component includes a gradated sub-surface depth extending in a radial direction.

18 Claims, 3 Drawing Sheets

(56) References Cited

U.S. PATENT DOCUMENTS

| | | | |
|---|---|---|---|
| 7,364,401 B2 | 4/2008 | Nakagawa et al. | |
| 7,644,583 B2* | 1/2010 | Leavesley | F02B 37/183 |
| | | | 60/602 |
| 8,474,257 B2* | 7/2013 | Yoshimoto | F01D 17/105 |
| | | | 60/602 |
| 8,869,527 B2* | 10/2014 | Werstat | F01D 17/105 |
| | | | 60/602 |
| 8,904,785 B2* | 12/2014 | Marques | F02B 37/18 |
| | | | 60/602 |
| 9,038,381 B2 | 5/2015 | Ehrmann et al. | |
| 9,127,590 B2* | 9/2015 | Schoenherr | F02B 37/183 |
| 9,200,532 B2* | 12/2015 | Palaniyappan | F01D 17/08 |
| 9,255,582 B2* | 2/2016 | Christmann | F04D 27/009 |
| 9,316,148 B1 | 4/2016 | Hastings et al. | |
| 9,506,398 B2* | 11/2016 | Dusik | F02B 37/18 |
| 9,546,597 B2* | 1/2017 | Swartz | F02C 7/06 |
| 9,638,099 B2* | 5/2017 | Micanek | F01D 17/105 |
| 10,024,166 B2* | 7/2018 | Zollinger | B23K 26/034 |
| 10,227,916 B2* | 3/2019 | Tomanec | F02B 37/186 |
| 10,443,486 B2 | 10/2019 | Huh | |
| 10,458,319 B2* | 10/2019 | Brady | B23K 26/28 |
| 10,890,108 B2* | 1/2021 | Kagimoto | F01D 17/105 |
| 2015/0097345 A1* | 4/2015 | House | F02B 39/16 |
| | | | 277/585 |
| 2015/0226110 A1* | 8/2015 | Wang | F02B 37/186 |
| | | | 60/600 |
| 2016/0011070 A1* | 1/2016 | Marek | G01M 15/04 |
| | | | 60/602 |
| 2018/0045105 A1* | 2/2018 | Tomanec | F01D 17/105 |
| 2019/0218996 A1* | 7/2019 | Mori | F16J 1/01 |

OTHER PUBLICATIONS

Chinese Office Action for Chinenese Application No. 201910372540. 5; Report Mail dated Feb. 18, 2021 (pp. 1-7).
Chinese Office Action for Chinense Application No. 201910372540. 5; Report Mail dated Sep. 16, 2021 (pp. 1-10).
German Office Action dated Oct. 6, 2021 for German Application No. 10 2019 111 661.9 (pp. 1-7).

* cited by examiner

ARTICULATING JOINT WITH A HIGH WEAR LIFE

INTRODUCTION

The subject disclosure relates to a joint, and more particularly, to an articulating joint with a high wear life that is, at least in-part, additive manufactured.

Articulating connections, or joints, are applied in any variety of industries and apparatuses associated with such industries. One example of an industry is the automotive industry, and one example of a related apparatus is a wastegate connection of a turbocharger. Many such connections may include two linkages that attach at an articulating connection that may wear via frictional contact between the linkages. Moreover, such connections may be found in high temperature environments that further aggravates the useful life of the connection. Unfortunately, to extend wear life, the alternative is to increase the mass and/or size of such connections that, undesirably, contributes toward additional weight, and/or converting to the use of specialized wear resistant alloys throughout the connection that contributes toward additional cost.

Accordingly, it is desirable to provide an articulating joint with an increased life span while keeping additional weight and/or cost at a minimum.

SUMMARY

In one exemplary embodiment, an articulating joint includes a first linkage, and a pin. The first linkage has a surface that defines an opening. The pin extends along a pivot axis, and is disposed, at least in-part, in the hole. The pin includes a core component made of a first material, and an outer component that, at least partially, circumferentially surrounds the core component, and is made of a wear resistant material. The outer component includes a gradated sub-surface depth that extends in a radial direction.

In addition to one or more of the features described herein, the pin is cylindrical and the core component is non-cylindrical.

In addition to one or more of the features described herein, the outer component is additive manufactured onto the core component.

In addition to one or more of the features described herein, the core component is cast.

In addition to one or more of the features described herein, the pin is cylindrical and the core component is non-cylindrical.

In addition to one or more of the features described herein, the first material is a base metal and the wear resistant material includes a wear resistant alloy.

In addition to one or more of the features described herein, the wear resistant alloy includes at least one of cobalt and nickel.

In addition to one or more of the features described herein, the first material is a base metal and the wear resistant material includes a ceramic.

In addition to one or more of the features described herein, the pin is a portion of a wastegate crank and the linkage is a wastegate rod of an automotive turbocharger.

In addition to one or more of the features described herein, the outer component includes a plurality of layers with an inner layer having a concentration of the first material that is greater than a concentration of the first material of an outer layer of the plurality of layers.

In addition to one or more of the features described herein, the outer layer includes a concentration of the wear resistant material that is greater than a concentration of the wear resistant material of the inner layer.

In addition to one or more of the features described herein, the inner layer is directly attached to the core component.

In addition to one or more of the features described herein, the first material is a base metal and the concentration of wear resistant material is represented by a ratio of the wear resistant material over the base metal, and the wear resistant material is an alloy.

In addition to one or more of the features described herein, the alloy includes at least one of cobalt and nickel.

In addition to one or more of the features described herein, the first material is a base metal and the wear resistant material includes a ceramic.

In addition to one or more of the features described herein, the core component includes a circumferentially continuous face that defines a fill region opened in a radially outward direction, and the fill region is filled with the wear resistant material.

In addition to one or more of the features described herein, the wear resistant material is applied via an additive manufacturing process.

In addition to one or more of the features described herein, the pin is cylindrical and the wear region is circumferentially discontinuous.

In another exemplary embodiment, a process of manufacturing an articulating joint includes determining wear regions of a pin of the articulating joint. Then forming a core component of the pin that includes fill regions associated with the wear regions. The fill regions are then filled with a wear resistant material via an additive manufacturing process.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
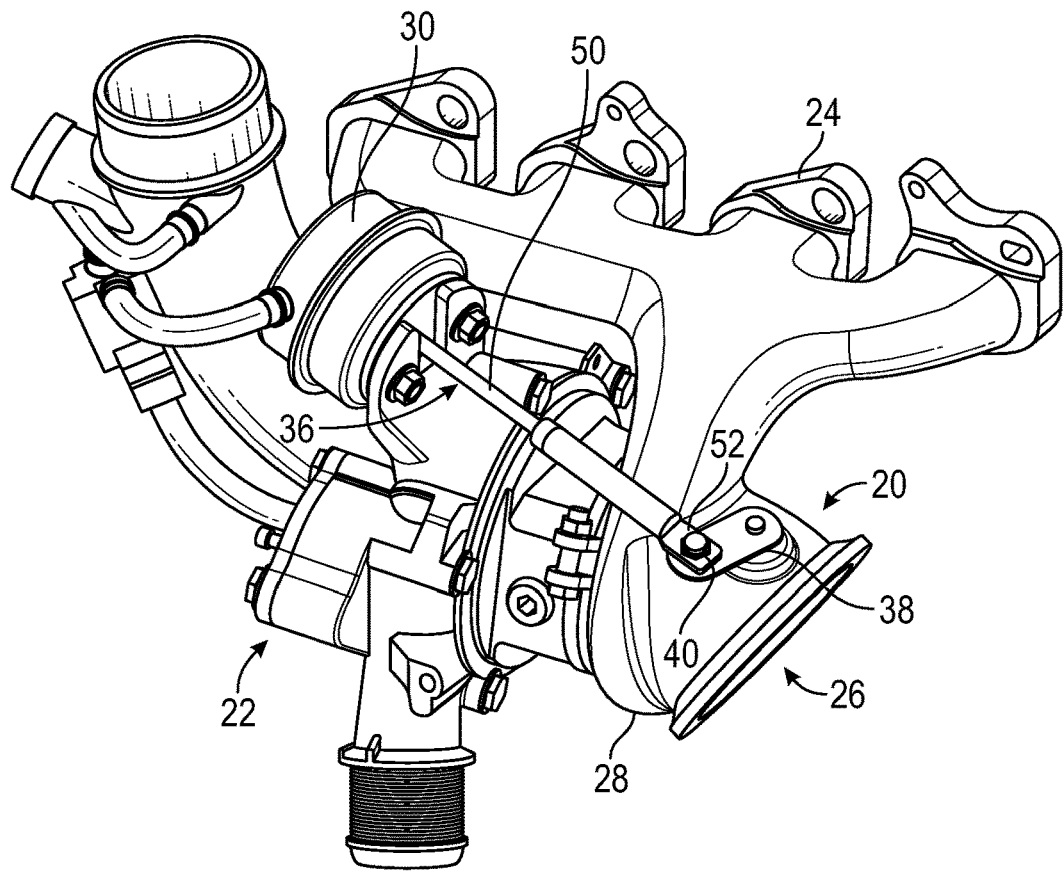
FIG. 1 is a perspective view of an articulating joint as one, non-limiting, exemplary embodiment, and used in an application of a turbocharger.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 illustrates an articulating joint, or linkage 20. In one embodiment, the articulating joint 20 may be applied to, or part of, a turbocharger 22 of an automotive combustion engine (not shown). The turbocharger 22 is adapted to be mounted between a fresh air intake manifold (not shown) and an exhaust manifold 24. The turbocharger 22 includes a waste gate assembly 26 and an exhaust bypass channel, or conduit, 28 in fluid communication with the exhaust manifold 24. It is contemplated and understood that the articulating joint 20 may be applied to any variety of mechanical applications where joint wear is of a concern.

In operation of the turbocharger 22, a turbine (not shown) of the turbocharger 22 is driven by exhaust gases flowing from the exhaust manifold 24. The turbine drives a compressor located in or upstream of an air intake manifold (not shown). The compressor pressurizes the incoming, fresh, air for mixing with fuel, then combustion within the combustion engine. The waste gate assembly 26 is generally located in the exhaust bypass conduit 28 that is in fluid communication with, and located downstream of, the exhaust manifold 24. The waste gate assembly 26 is configured to flow exhaust gas that bypasses the turbine when the waste gate assembly 26 is in an open position.

Figure 2:
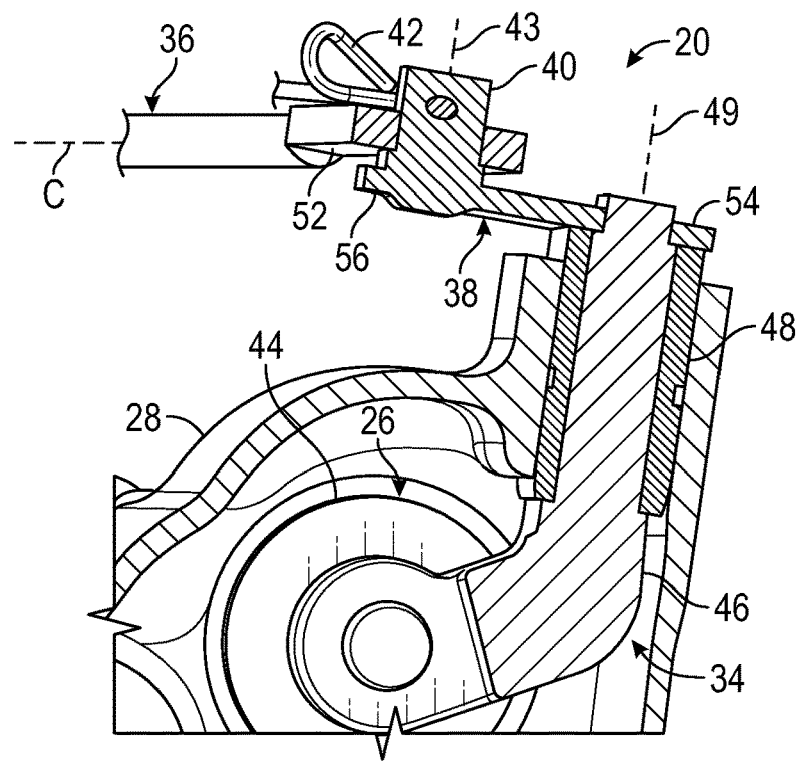
FIG. 2 is an enlarged cross section of the articulating joint.

Referring to FIGS. 1 and 2, the waste gate assembly 26 may include an actuator device 30, the articulating joint 20, and a valve, 34 (e.g., gate or flap valve, see FIG. 2) located in the exhaust bypass conduit 28. The articulating joint 20 is located between, and operably connects, the actuator device 30 and the flap valve 34 for moving the valve 34 between open and closed positions. In various embodiments, the actuator device 30 may operate via one or more of oil pressure, air vacuum, an electrical solenoid, or other means.

The articulating joint 20 may include two linkages 36, 38, a pin 40, and a fastener 42 (e.g., cotter pin). In one example, the linkage 36 is pivotally connected to the pin 40 for rotation about an axis 43, and the pin 40 is rigidly attached to the linkage 38. The valve 34 may include a gate 44, a shaft 46, and a bushing 48. The gate 44 is adapted to obstruct exhaust gas flow when in the closed position, and is attached to the shaft 46. The shaft 46 projects through the exhaust conduit 28 for rigid attachment to the linkage 38. The shaft 46 is configured to rotate about an axis 49 upon actuation of the articulating joint 20. The bushing 48 assists the shaft 46 in this rotation and provides a seal to limit, or prevent, leakage of exhaust gas. In one embodiment, the linkage 38 radially spans between the axes 43, 49, which may be substantially parallel to one-another. The centerline C of linkage 36 may be substantially normal to the axes 43, 49.

In one example, the linkage 36 may be an elongated rod, and the linkage 38 may be a lever. The linkage 36 may extend along centerline C, and between portions 50, 52 (e.g., opposite end portions). End portion 50 is connected to the actuator device 30 and end portion 52 is pivotally connected to the pin 40. The actuator device 30 is adapted to move the linkage 36 along the centerline C. In the application example of the turbocharger 22, the pin 40 may be a portion of a wastegate crank (i.e., includes the linkage 38), and the linkage 36 may be a wastegate rod.

Figure 3:
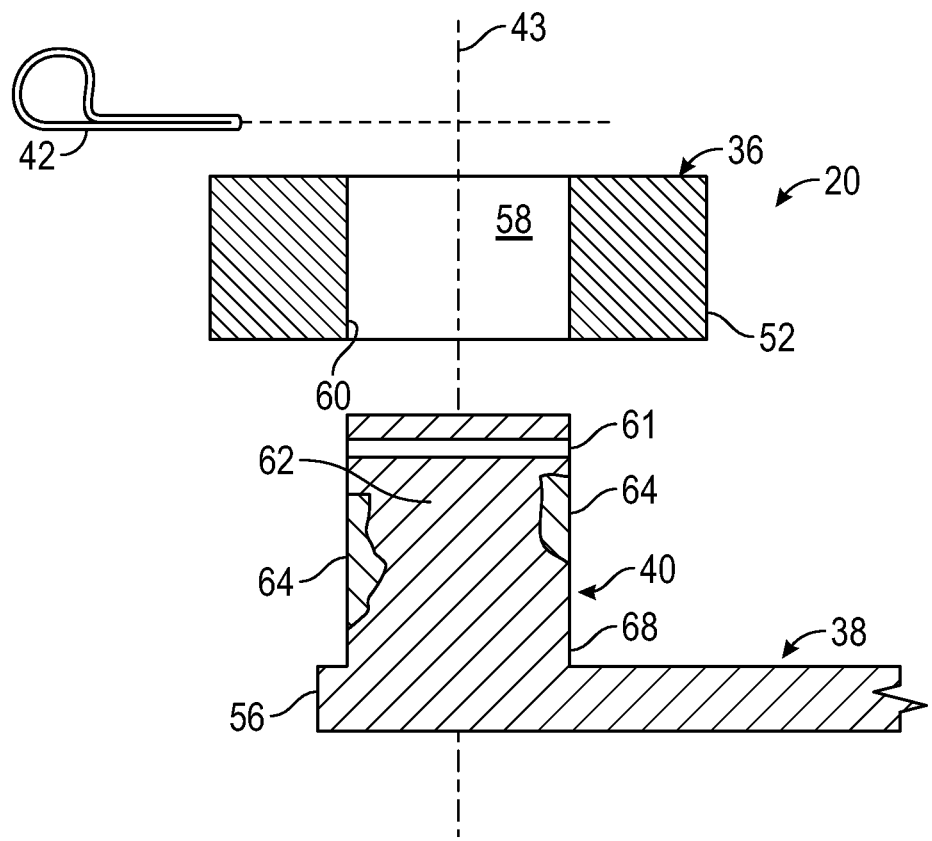
FIG. 3 is a unassembled cross section of the articulating joint.

Referring to FIGS. 2 and 3, the linkage 38 includes, and extends between, segments 54, 56 (e.g., opposite end segments). The segment 54 of linkage 38 may be rigidly connected to a part of the shaft 46 that projects outward from the exhaust conduit 28. The segment 56 is rigidly attached to the pin 40. More specifically, the linkage 38 projects radially outward from the shaft with respect to axis 49, and to the segment 56. The pin 40 is concentric to axis 43, and generally normal to the longitude (i.e., elongated length) of the linkage 38.

Referring to FIG. 3 and when assembled, the pin 40 extends through an opening 58 (e.g., through-bore or hole) in the portion 52 of the linkage 36. The opening 58 is defined by a surface 60 carried by, and of, the portion 52. In one embodiment, the surface 60 may be circumferentially continuous and substantially cylindrical. In another embodiment, the pin 40 may be attached to the portion 52 of the linkage 36, and the opening 58 may be in the segment 56 of the linkage 38 (not shown).

The fastener 42 is adapted to maintain the pin 40 in the opening 58 of the linkage 36. In one example, the fastener 42 may be connected, or mated, to a part of the pin 40 that projects outward from the portion 52 of the linkage 36. In one embodiment, the fastener 42 is received in a through-bore 61 (see FIG. 3) defined by the pin 40. In one example, the pin 40 is substantially cylindrical, and is in sliding contact (i.e., pivoting or rotational contact) with the surface 60 of the portion 52 when the joint 20 is being articulated. This sliding contact produces friction between the pin 40 and the surface 60 that may contribute toward wear.

Figure 4:
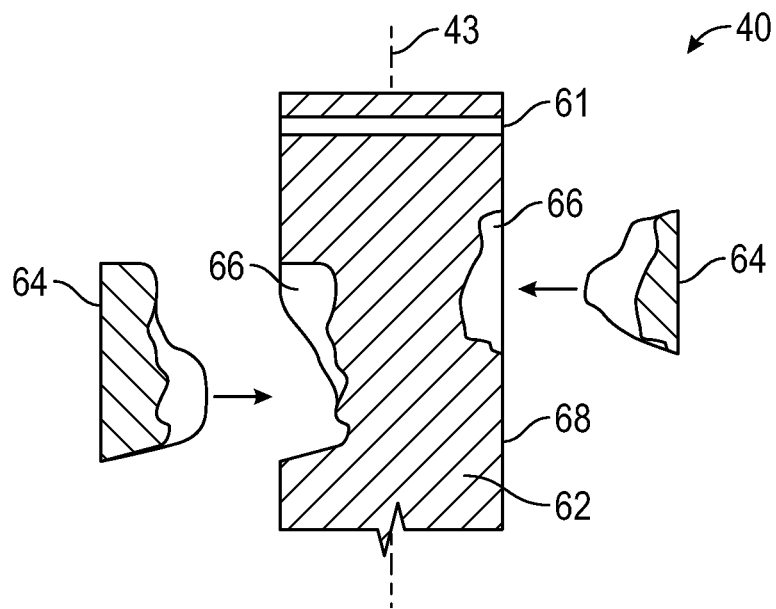
FIG. 4 is a cross section of a pin of the articulating joint.

Referring to FIGS. 3 and 4, the pin 40 includes a core component 62, one or more outer components 64, and at least one fill region 66 associated with each respective outer component 64. The core component 62 includes and carries a face 68 that is circumferentially continuous with respect to axis 43, and faces substantially radially outward. Part(s) of the face 68 define the fill region(s) 66, and other parts may be directly opposed to the surface 60 of the portion 52. In one example, the pin 40 may be concentrically located about the axis 43, and may further be cylindrical. In this example, the core component 62 may not be located concentrically about the axis 43, and is not cylindrical on its own.

The outer components 64 are adapted and orientated to fill the fill regions 66 (see FIG. 4), and generally makes the completed pin 40 concentric to the axis 43, and in one example, cylindrical. The core component 62 is made of a core material, and the outer component 64 is generally made of a wear resistant material. Locations and radial depths of the fill regions 66, and thus placement of the wear resistant material, is dependent upon specific wear locations of the joint 20 while maintaining pin strength and/or ductility substantially attributable by the core component 62. In one example, the core material is a base metal adding strength and/or ductility to the pin 40, and the wear resistant material is an alloy that may include concentrations of nickel and/or cobalt. In another example, the wear resistant material may be a ceramic, or may include concentrations of a ceramic.

In one embodiment, the fill regions 66, and thus the outer components 64, are circumferentially discontinuous, and are isolated to pin areas of high wear (i.e., friction between the pin 40 and the surface 60 of the portion 52. In this embodiment, the depth of the fill regions 66, and thus the radial thickness of the outer component(s) 66 may vary to maximize useful life of the pin 40 while maintaining needed pin strength.

In one embodiment, the core component 62 is cast with the pre-determined fill regions 66. Furthermore, the core component 62 may be cast as one, homogeneous, piece with the linkage 38. After casting of the core component 62, the fill regions 66 may be filled by, for example, an additive manufacturing process (see FIG. 5). Upon completion of the additive manufacturing process, the pin 40 may be machined to enhance the cylindrical shape, enhance other shapes, and or provide various features such as the through-bore 61.

Figure 5:
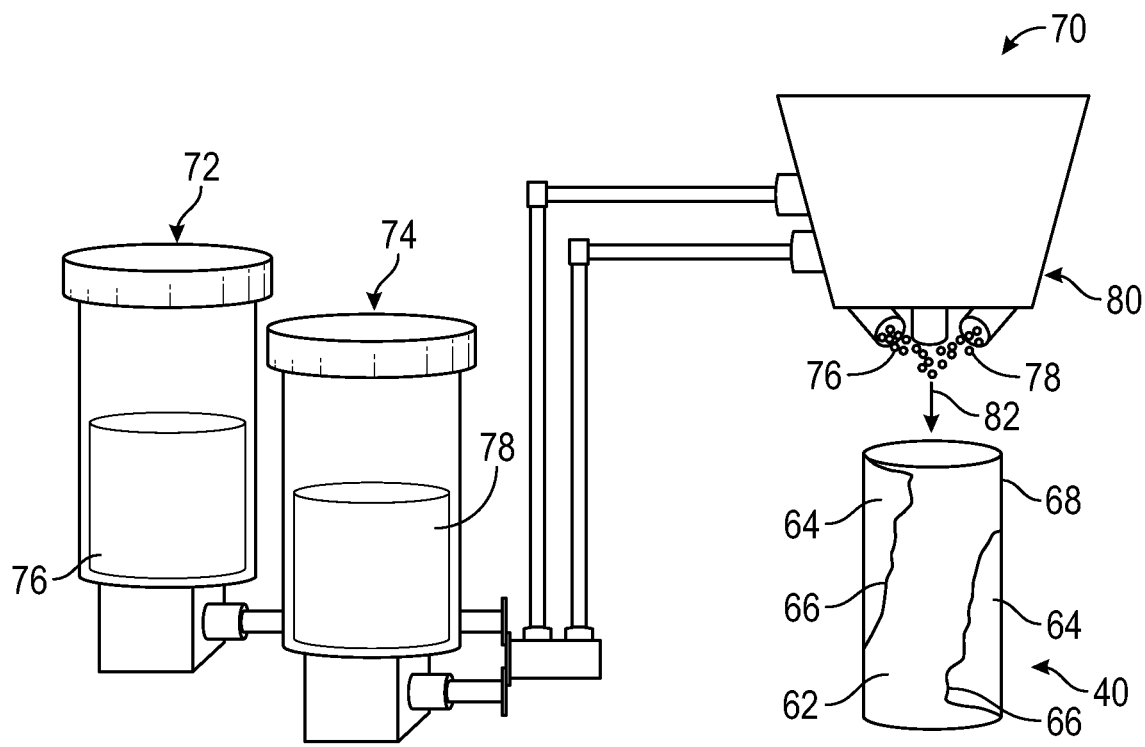
FIG. 5 is a schematic of an additive manufacturing machine used to, at least in-part, manufacture the articulating joint.

Referring to FIG. 5, the additive manufacturing process, may be performed by an additive manufacturing machine 70 that includes at least one hopper (i.e., two illustrated as 72, 74) containing at least one powder (i.e., two illustrated as 76, 78), and a head device 80. The head device 80 may be adapted to controllably move in a three dimensional space, controllably receive the powders 76, 78 from the respective hoppers 72, 74, and emits the powders 76, 78 in conjunction with a laser beam 82 at the fill regions 66 of the core component 62. In one example, the powder 76 may be the wear resistant material generally used for the wear resistant component 64, and the powder 78 may be the base metal used for the core component 62. In other embodiments, the powder 76 and/or the powder 78 may be blended.

The additive manufacturing process may be controlled to produce a gradated outer component 64 that fills the fill regions 66. More specifically, the blend of powders 76, 78 may be varied at particular radial depths of the outer component 64. At a location closest to the face 68 of the core component 62, the blend may have a high concentration of the base metal with a respective low concentration of the wear resistant material. Concentrations of the wear resistant material may increase and the concentrations of the base metal may decrease as the fill location moves away from the core component 62 within the fill region 66. In this way, the adhesion of the wear resistant material to the core component 62 may be enhanced by reducing the difference in the coefficients of thermal expansion.

Figure 6:
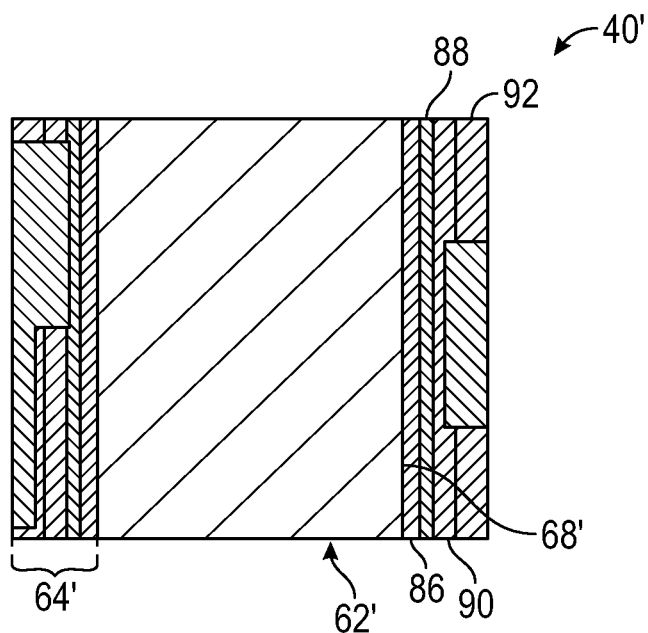
FIG. 6 is a cross section of a second embodiment of the pin.

Referring to FIG. 6, a second embodiment of a pin is illustrated wherein like elements to the first embodiment have like identifying numerals except with the addition of a prime symbol suffix. A pin 40' may include a core component 62' that includes and carries a substantially cylindrical face 68', and an outer component 64' that may be circumferentially continuous, and envelopes the face 68'. The outer component 64' may include a multitude of layers (i.e., four illustrated as 86, 88, 90, 92), with layer 86 being in contact with the core component 62', layer 88 spanning radially between and in contact with layers 86, 90, layer 90 spanning radially between and in contact with layers 88, 92. Layer 92 is located radially outward from, and is in contact with, the adjacent layer 90. The layers 86, 88, 90, 92 may generally have gradated concentrations of the wear resistant material, such that layer 86 has the lowest concentration of the wear resistant material and the highest concentration of the base metal. Each adjacent layer may then have an increasing concentration of the wear resistant material with the outer layer 92 having the highest concentration. That is, the concentration of wear resistant material is represented by a ratio of the wear resistant material over the base metal content.

Advantages and benefits of the present disclosure include enhance adhesion of a wear resistant material to a core component of a pin providing a more robust articulating joint 20, an increase in joint life while minimizing weight, a precise material integration in only depths and wear affected areas, and the use of an additive manufacturing process to maintain the fit, form and function of the joint 20 not otherwise possible with more conventional methods such as, for example, plating.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. An articulating joint comprising:
   a first linkage including a surface defining an opening; and
   a pin extending along a pivot axis and disposed at least in-part in the opening, the pin including a core component made of a first material and an outer component that at least partially circumferentially surrounds the core component and is made of a wear resistant material, the outer component including an outer surface having a concentration of wear resistant material, wherein the concentration of wear resistant material decreases from the outer surface radially inwardly into the outer component.

2. The articulating joint set forth in claim 1, wherein the pin is cylindrical and the core component is non-cylindrical.

3. The articulating joint set forth in claim 1, wherein the outer component is additive manufactured onto the core component.

4. The articulating joint set forth in claim 3, wherein the core component is cast.

5. The articulating joint set forth in claim 4, wherein the pin is cylindrical and the core component is non-cylindrical.

6. The articulating joint set forth in claim 5, wherein the first material is a base metal and the wear resistant material includes a wear resistant alloy.

7. The articulating joint set forth in claim 6, wherein the wear resistant alloy includes at least one of cobalt and nickel.

8. The articulating joint set forth in claim 5, wherein the first material is a base metal and the wear resistant material includes a ceramic.

9. The articulating joint set forth in claim 2, wherein the pin is a portion of a wastegate crank and the linkage is a wastegate rod of an automotive turbocharger.

10. The articulating joint set forth in claim 3, wherein the outer component includes a plurality of layers including an outer layer and an inner layer, wherein the concentration of wear resistant material decreases in each of the plurality of layers from the outer later toward the inner layer.

11. The articulating joint set forth in claim 10, wherein the inner layer is directly attached to the core component.

12. The articulating joint set forth in claim 11, wherein the first material is a base metal and the concentration of wear resistant material is represented by a ratio of the wear resistant material over the base metal, and the wear resistant material is an alloy.

13. The articulating joint set forth in claim 12, wherein the alloy includes at least one of cobalt and nickel.

14. The articulating joint set forth in claim 11, wherein the first material is a base metal and the wear resistant material includes a ceramic.

15. The articulating joint set forth in claim 1, wherein the core component includes a circumferentially continuous face that defines a fill region opened in a radially outward direction, and the fill region is filled with the wear resistant material.

16. The articulating joint set forth in claim 15, wherein the wear resistant material is applied via an additive manufacturing process.

17. The articulating joint set forth in claim 15, wherein the pin is cylindrical and the wear resistant material region is circumferentially discontinuous.

18. A process of manufacturing an articulating joint comprising:

determining wear regions of a pin of the articulating joint, the pin having an outer surface;

forming a core component of the pin including fill regions associated with the wear regions; and filling the fill regions with a wear resistant material via an additive manufacturing process, the wear resistant material having a concentration at the outer surface, wherein the concentration of wear resistant material decreases radially inwardly from the outer surface into the pin.

* * * * *